(12) United States Patent
Whitcomb

(10) Patent No.: US 7,305,349 B2
(45) Date of Patent: Dec. 4, 2007

(54) REPLICA COMMERCE SYSTEM AND METHOD

(76) Inventor: Curtis A. Whitcomb, 6318 E. Co. Rd. 100 North, Frankfort, IN (US) 46041-8982

(*) Notice: Subject to any disclaimer, the term of this patent is extended or adjusted under 35 U.S.C. 154(b) by 1044 days.

(21) Appl. No.: 10/056,832

(22) Filed: Jan. 24, 2002

(65) Prior Publication Data

US 2002/0123903 A1   Sep. 5, 2002

Related U.S. Application Data

(60) Provisional application No. 60/264,278, filed on Jan. 26, 2001.

(51) Int. Cl.
*G06Q 99/00* (2006.01)
(52) U.S. Cl. ......................................................... 705/1
(58) Field of Classification Search .................. 705/1
See application file for complete search history.

(56) References Cited

U.S. PATENT DOCUMENTS

| | | |
|---|---|---|
| 5,127,037 A | 6/1992 | Bynum |
| 5,960,411 A * | 9/1999 | Hartman et al. .............. 705/26 |
| 6,092,053 A | 7/2000 | Boesch et al. |
| 2002/0040332 A1 | 4/2002 | Maari et al. |

2002/0052799 A1   5/2002   Starikov

OTHER PUBLICATIONS www.mattel.com, "Hot Wheels", 2 pages.*
Museum Dreams are King-sized . . . to hold them back, The Post-Standard, Oct. 1998, 6 pages.*
Sweating the details Fernwood fo Maine's colorful, handcrafted replicas of buildings and scenes find a ready, robust market. Portland Press Herald; Portland, ME; Jun. 11, 2000; by Tux Turkel, 4 pages.
Gifts With Verve/Give them something they don't yet have, Newsday; Long Island, NY; Jan. 24, 1999; by Laurie Squire, 4 pages.

* cited by examiner

*Primary Examiner*—Dennis Ruhl
(74) *Attorney, Agent, or Firm*—Baker & Daniels LLP

(57) ABSTRACT

A method of providing a purchaser of a product with a replica portraying the product includes the steps of receiving product information relating to a visible feature of the product, and causing a replica including the visible feature of the product to be transferred to the purchaser. The method may also include obtaining information related to the owner of the purchased product and creating a certificate of ownership associating the product, the replica, and the owner of the product. Also, a registrar may be provided to maintain records associating the product, the replica, and the owner. The registrar may obtain information from a merchant of the product, and transfer the information to a replica manufacturer to obtain a replica.

1 Claim, 4 Drawing Sheets

REPLICA COMMERCE SYSTEM AND METHOD

This application claims priority of U.S. Provisional Patent Application Ser. No. 60/264,278, filed Jan. 26, 2001, the disclosure of which is expressly incorporated herein by reference.

TECHNICAL FIELD OF THE INVENTION

The present invention is related to commerce and systems used to facilitate commerce of replicas portraying products.

BACKGROUND AND SUMMARY OF THE INVENTION

Many individuals and Americans in particular have a special fondness for automobiles and other vehicles. For memorial and nostalgia reasons, they often maintain a picture collection of all the vehicles they have owned. The present invention addresses this desire of individuals to memorialize purchases of manufactured products and in particular to memorialize the purchase of vehicles by providing individuals with replicas of the purchased vehicles.

Pursuant to an exemplary embodiment, there is provided a method of providing a purchaser of a product with a replica portraying the product. The method includes the steps receiving information from which visible features of the product purchased by the purchaser may be obtained, and causing a replica which portrays the product and at least a portion of the visible features of the product to be transferred to the purchaser.

Pursuant to another embodiment, there is provided a method of providing purchasers of vehicles with replicas portraying the vehicles purchased. The method includes the step of receiving make, model, and at least one other visible feature of a vehicle purchased by a purchaser and receiving information about an owner of the vehicle purchased. Another step of the method includes generating, based upon the make of the vehicle, the model of the vehicle, and the information of the owner, a certificate of ownership that links the owner with a replica portraying the make, the model, and the at least one other visible feature of the vehicle purchased by the purchaser. The method also includes the step of causing the replica and the certificate of ownership to be transferred to the owner.

Pursuant to another embodiment of the present invention, there is provided a registrar computing device that receives make, model, and at least one other visible feature of a vehicle purchased by a purchaser and information about an owner of the vehicle purchased. The registrar computing device also causes a certificate of ownership to be generated that links the owner with a replica portraying the make, the model, and the at least one other visible feature of the vehicle purchased by the purchaser. The registrar computing device also causes the replica and the certificate of ownership to be transferred to the owner.

DETAILED DESCRIPTION OF EMBODIMENTS OF THE INVENTION

Figure 1:
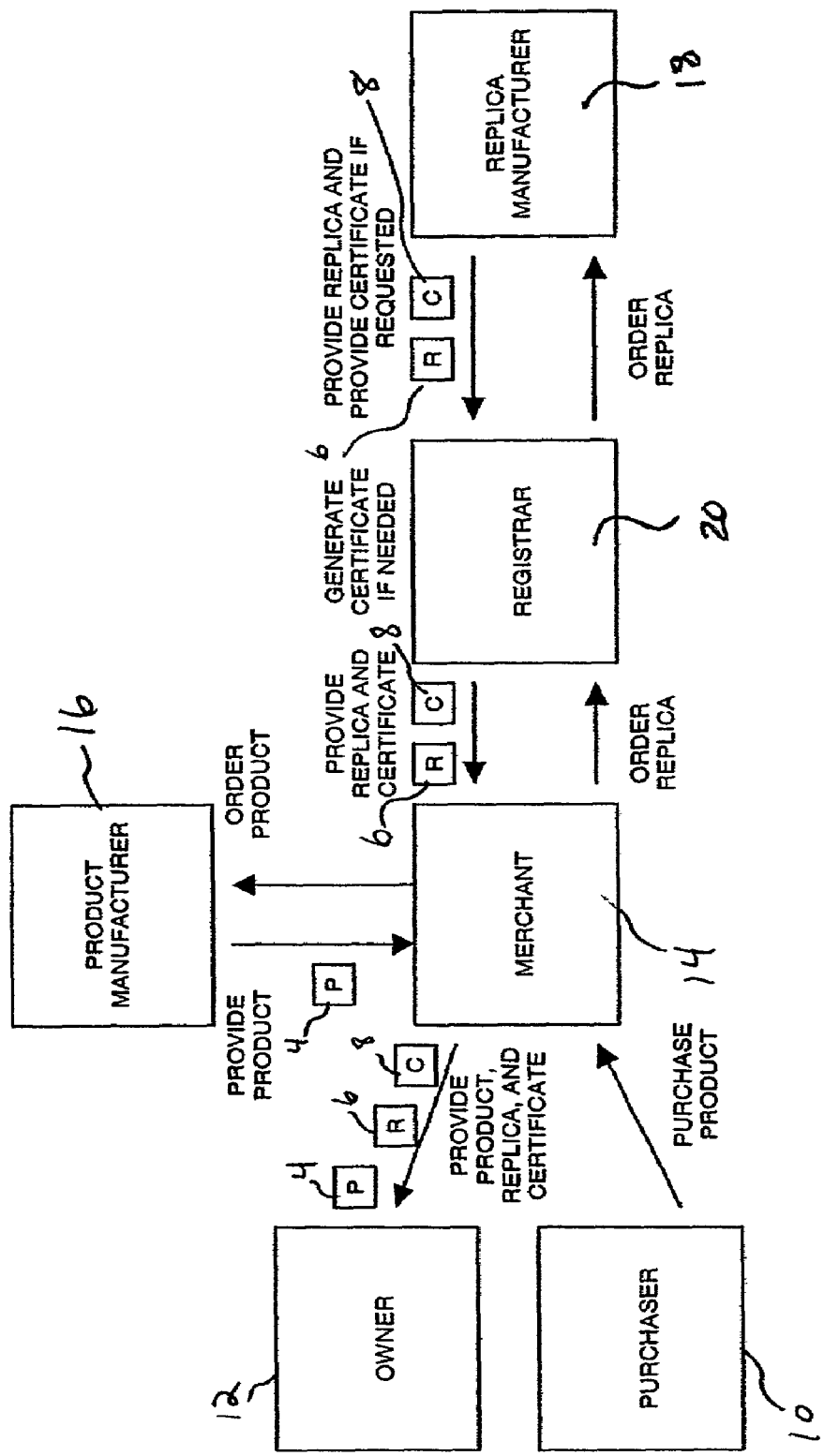
FIG. 1 is a conceptual drawing of an environment incorporating a system according to the present invention.

While the invention is susceptible to various modifications and alternative forms, exemplary embodiments thereof have been shown by way of example in the drawings and will herein be described in detail. It should be understood that there is no intent to limit the invention to the particular forms disclosed, but on the contrary, the intention is to cover all modifications, equivalents, and alternatives falling within the spirit and scope of the invention as defined by the appended claims.

FIG. 1 shows the roles played by various participants of a system and method according to the present invention and an exemplary flow within the system of products 4 to be portrayed, replicas 6 portraying products 4, and certificates of ownership 8. As shown, a participant may be a purchaser 10, an owner 12, a merchant 14, a product manufacturer 16, a replica manufacturer 18, and a registrar 20. Purchaser 10 generally purchases a product 4 from merchant 14 for himself and/or another. The terms "purchase," "purchases," "purchased" and "purchasing" are used herein to generally mean "an exchange of value" and includes the concepts of buying, leasing, bartering, and/or bestowing. In the case of a bestowed product, it should be appreciated that there is still an exchange of value because the person bestowing product 4 receives goodwill in return for the bestowed product.

Owner 12 is generally a recipient of product 4 purchased by purchaser 10. Owner 12 may or may not be the same person as purchaser 10. Merchant 14 generally sells products 4 to purchasers 10. Product manufacturer 16 generally manufactures products 4 such as automobiles, watercraft, motorcycles, aircraft, recreational vehicles, farm equipment, construction equipment, etc. Replica manufacturer 18 generally manufactures replicas 6 which portray products 4. Typically, replica manufacturer 18 manufactures a replica 6 to portray a subset of visible features of a product 4. Further, replica manufacturer 18 also typically manufacturers the replica 6 so that the replica 6 is smaller than the product 4. However, it is conceivable that the replica 6 could be larger than or identical to the product 4 being portrayed. Also, replica manufacturer 18 typically manufactures the replica 6 to be a substantially scaled replica (e.g. 1:18, 1:24, etc) of the product 4. Registrar 20 generally maintains certification of ownership information which links a product 4 and a replica 6 portraying the product 4 to an owner 12 of the product 4, as will be further described below.

It should be understood that any of the various participants may be individuals and/or organizations and each may play one or more of the depicted roles. For example, a participant may manufacture products 4 and sell the products 4 to purchasers 10, thus playing the role of both product manufacturer 16 and merchant 14. Also, it should be appreciated that other non-depicted participants may be involved such as distributors and delivery agents. These other participants generally provide services for the depicted participants and can be viewed as agents of the depicted participants.

Figure 2:
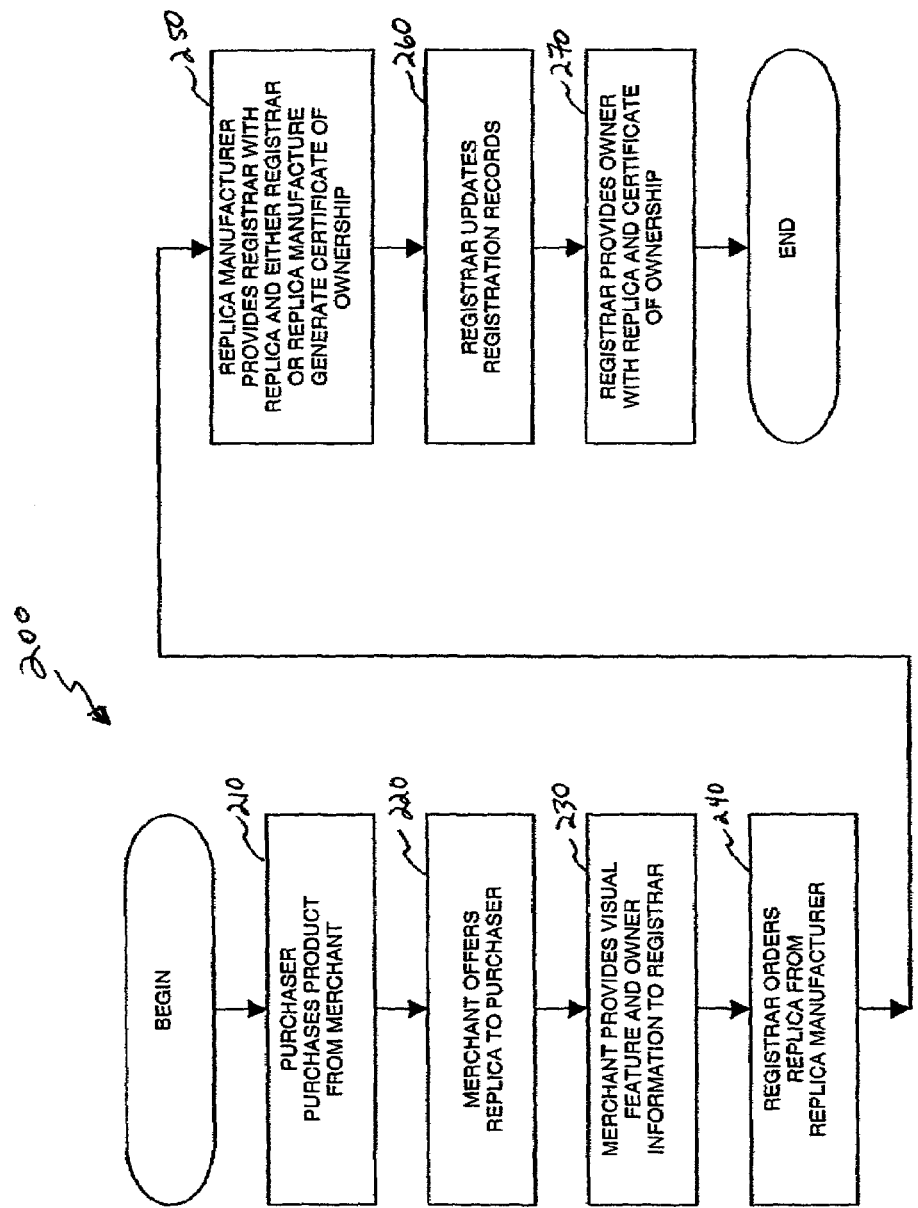
FIG. 2 is a flow diagram of a method according to the present invention.

Referring now to FIG. 2, a method 200 of memorializing the purchase of a product by providing the purchaser 10 of the product 4 with a replica 6 begins in step 210 with purchaser 10 purchasing a product 4 from merchant 14 for himself and/or another. Typically, the product 4 is some type of vehicle such as an automobile, an aircraft, a watercraft, a piece of farm machinery, or a recreational vehicle. However, the product 4 could be any item that owner 12 may want memorialized in a replica 6.

Merchant 14 in step 220 offers purchaser 10 an opportunity to buy a replica 6 that portrays the purchased product 4. Merchant 14 may provide purchasers 10 or owners 12 with a replica 6 in the normal course of business (omitting step 220). In such a scenario, the price of the product 4 essentially includes the price of the replica 6, thus giving purchasers 10 the impression that the replica 6 is a gift.

If purchaser 10 chooses to buy a replica 6 portraying the product 4, then merchant 14 in step 230 provides registrar 20 with visual features of the replica 6 as well as identification information of owner 12 to be associated with the replica 6 and the product 4. For example, if an automobile is purchased for owner 12, merchant 14 in step 230 may provide registrar 20 with make, model, exterior color, interior color, wheel design, vehicle identification number (VIN) and/or other information about the automobile (i.e., product 4) to be portrayed by the replica 6. Merchant 14 in step 230 may also provide registrar 20 with the name and address of owner 12 of the product 4 so that registrar 20 can link the product 4 and the replica 6 to owner 12.

In an alternate embodiment, registrar 20 obtains the product information and the owner information independent of merchant 14. For example, registrar 20 may ascertain the product and owner information from public records or purchase the information from a private source. In this embodiment, registrar 20 interacts with replica manufacturer 18 and owner 12 in the manner described below, but substantially independent of merchant 14.

In response to receiving the product information and owner information from merchant 14 or otherwise obtaining the information, registrar 20 in step 240 orders from replica manufacturer 18 a replica 6 that portrays the product 4. In the above-mentioned automobile example, registrar 20 in step 240 may provide replica manufacturer 18 with make, model, exterior color, interior color, wheel design, vehicle identification number and/or other information about the product 4 to be portrayed by the replica 6. Alternatively, registrar 20 in step 240 may provide replica manufacturer 18 with a product number, catalog number, and/or other information from which replica manufacturer 18 can determine the visible features of the replica 6.

Registrar 20 in step 240 may also provide replica manufacturer 18 with the name and address of owner 12 of the product 4 so that replica manufacturer 18 can create a personalized certificate of ownership 8 that links the product 4 and the replica 6 to owner 12. In an alternative embodiment of the present invention, registrar 20 generates the personalized certificate of ownership 8. Accordingly, registrar 20 need not provide such information to replica manufacturer 18.

In response to the replica order from registrar 20, replica manufacturer 18 in step 250 provides registrar 20 with a replica 6 that portrays the product 4. Replica manufacturer 18 may simply select a suitable replica 6 from replicas in stock. Alternatively, replica manufacturer 18 may custom manufacture replica 6 based on information received from registrar 20.

In an exemplary embodiment, replica manufacturer 18 manufacturers the replica 6 such that the replica 6 has an identifier, such as an attached identification number. The identification number of the replica 6 may be similar to the identification number of the product 4. In the automobile example, replica manufacturer 18 may stamp the replica 6 with the VIN of the automobile. Alternatively, the replica manufacturer 18 may stamp the replica 6 with an identification number derived from the identification number of the product 4. For example, the identification number of the replica 6 may be the identification number of the product 4 prefixed and/or sufficed with the letter "R", the letter "T" or some other symbol(s), letter(s), and/or number(s).

In response to the replica order from registrar 20, replica manufacturer 18 in step 250 also provides registrar 20 with a certificate of ownership 8 which links the product 4 and the replica 6 to owner 12 of the product 4. For example, replica manufacture 18 may provide registrar 20 with a certificate of ownership 8 that includes ownership information such as the name and address of owner 12 and product information such as the identification number of the product 4, make of the product 4, model of the product 4, color of the product 4, etc. In the automobile example, replica manufacturer 18 may generate the certificate of ownership 8 such that it resembles the state-issued title and registration of the automobile. Further, as indicated above, the certificate of ownership 8 in an alternative embodiment is generated by registrar 20.

Registrar 20 in step 260 updates registration records based on the replica 6 and certificate of ownership 8 received from replica manufacturer 18. In one embodiment, registrar 20 updates the registration records to include information about the product 4, the replica 6, and owner 12. For example, registrar 20 may update the registration records to include the identification numbers of both the product 4 and the replica 6, and to associate those identification numbers with the name of owner 12.

Registrar 20 in step 260 may also update the registration records to include other information about the product 4, the replica 6, and/or owner 12. For example, registrar 20 may record visible features of the product 4 such as make, model, exterior color, interior color, engine type, wheel design, etc., and in particular record those visible features that are portrayed by the replica 6. Registrar 20 may also record other information about owner 12 such as address and telephone number.

In step 270, registrar 20 provides owner 12 with the replica 6. Further, if a certificate of ownership 8 is generated for owner 12, then registrar 20 provides owner 12 with the certificate of ownership 8. Registrar 20 may provide owner 12 with the replica 6 and the certificate of ownership by sending the replica 6 and the certificate of ownership 8 to merchant 14 and having merchant 14 transfer the replica 6 and the certificate of ownership 8 to owner 12. Alternatively, registrar 20 may send the replica 6 and the certificate of ownership 8 to owner 12 directly. Registrar 20 could also request that replica manufacturer 18 send the replica 6 and the certificate of ownership 8 to owner 12 instead of registrar 20.

Figure 3:
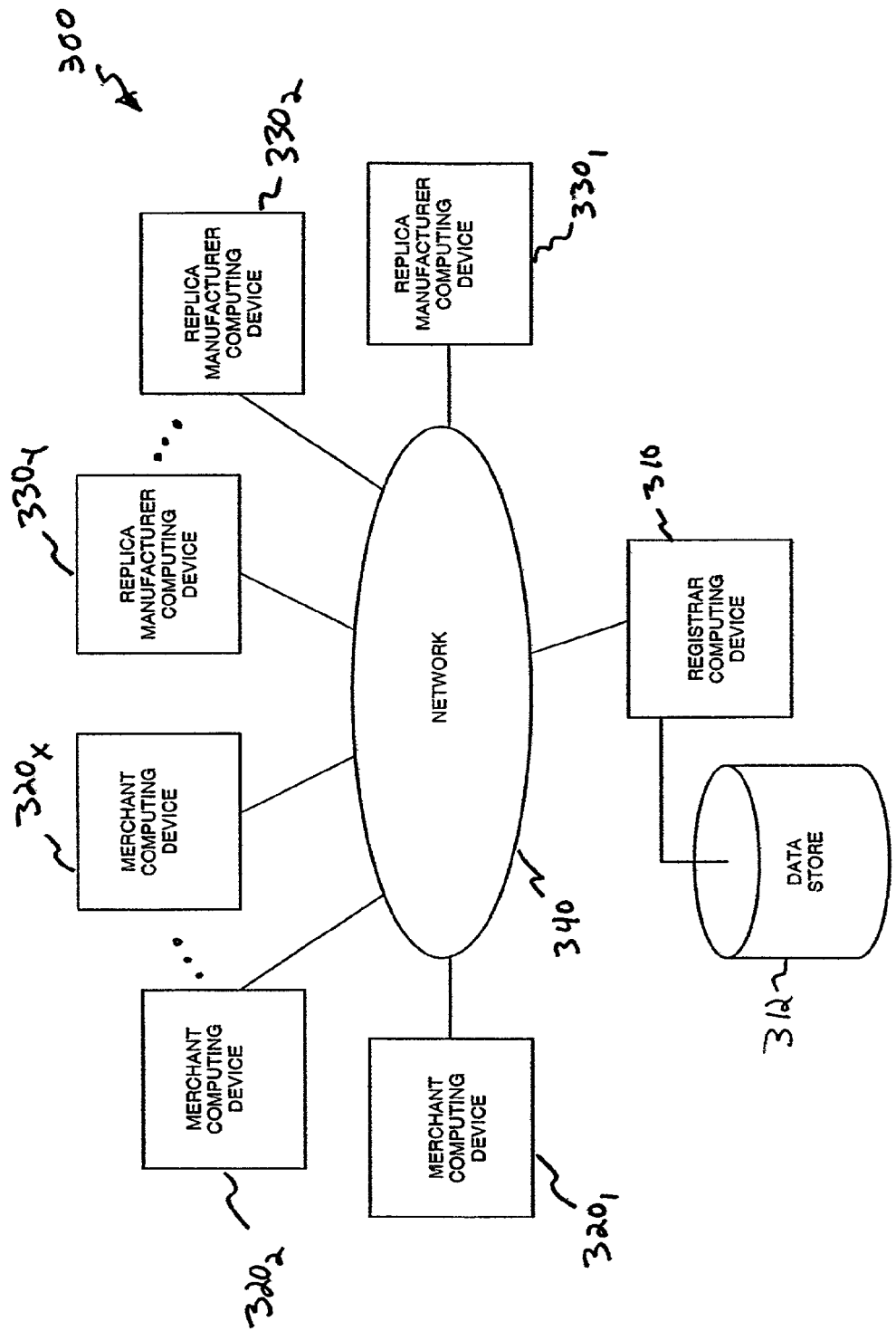
FIG. 3 is a block diagram of a system according to the present invention.

An exemplary system 300 for aiding the execution of the method of FIG. 2 is illustrated in FIG. 3. System 300 may also be used to implement the method of FIG. 4 which is described below.

As illustrated, a registration computing device 310, merchant computing devices $320_1, 320_2 \ldots 320_X$, and replica manufacturer computing devices $330_1, 330_2 \ldots 330_Y$ are coupled to one another via a network 340. The network 340 may include multiple public or private LANs and/or WANs that are operably coupled to one another via routers, switches, hubs, gateways, proxies, and/or firewalls. In an exemplary embodiment, the network 340 leverages the Internet to provide an inexpensive mechanism for interconnecting registrar computing device 310, merchant computing devices $320_1, 320_2 \ldots 320_X$, and replica manufacturer computing devices $330_1$, $330_2$ ... $330_Y$ which may be geographically dispersed from one another.

In an exemplary embodiment, registrar computing device 310 communicates with merchant computing devices $320_1$, $320_2$ ... $320_X$ and replica manufacturer computing devices $330_1$, $330_2$ ... $330_Y$ in accordance with the HyperText Transport Protocol (HTTP) and other Internet Protocols (IP). Accordingly, the services of registrar computing device 310 are generally available to any computing device that supports the appropriate IPs. Most personal computers such as those manufactured by Dell and MacIntosh include web browsing software that provide an interface to services delivered via the IPs. However, many other devices are being developed that include web browsing capabilities. For example, set-top boxes such as Microsoft's WebTV, palm computing devices such as 3COM's Palm Pilot, and certain digital mobile phones include web browsing capabilities and could be used to access the services of registrar computing device 310.

Figure 4:
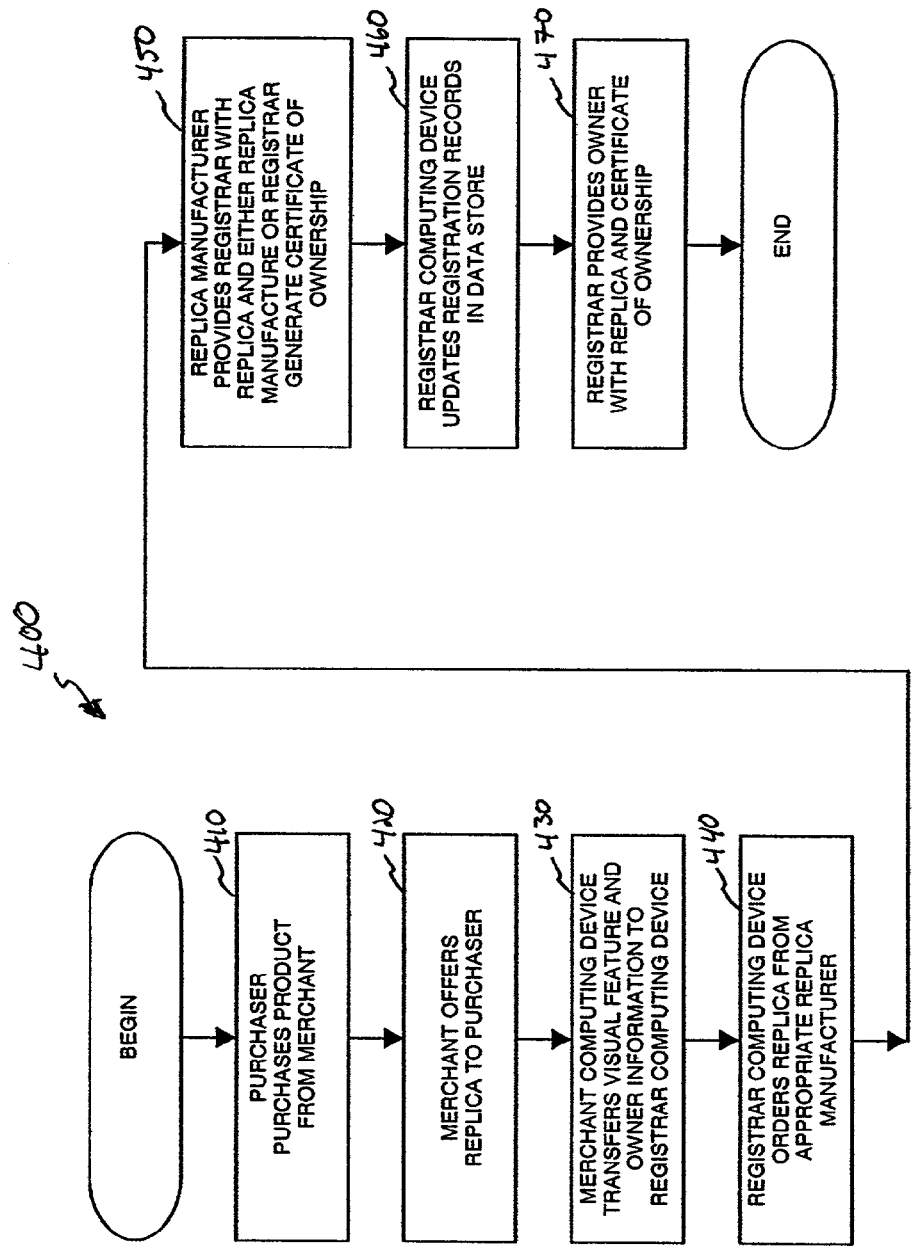
FIG. 4 is a flow diagram of another embodiment of a method according to the present invention.

Referring now to FIG. 4, there is illustrated a second method 400 of providing purchasers 10 of products 4 with replicas 6. Like the method of FIG. 2, method 400 begins in step 410 with purchaser 10 purchasing a product 4 from merchant 14 for himself and/or another, and merchant 14 in step 420 offering purchaser 10 an opportunity to buy a replica 6 that portrays the purchased product 4.

If the purchaser 10 chooses to buy a replica 6 portraying the product 4, then the merchant 14 in step 430 provides registrar 20 with visual features of the replica 6 as well as identification information of owner 12 to be associated with the replica 6 and the product 4. Merchant 14 may transmit this replica order information to registrar computing device 310 via merchant computing device 320 and network 330. For example, if an automobile is purchased for the owner 12, merchant 14 in step 430 may enter into merchant computing device 320 the make, model, exterior color, interior color, wheel design, VIN and/or other information about the product 4 to be portrayed by the replica 6. Merchant 14 in step 430 may also enter into merchant computing device 320 the name and address of owner 12 of the product 4 so that registrar 20 can link the replica 6 and the product 4 to owner 12. It should be noted, however, that merchant computing device 320 may already include much of the visible feature information for the product 4. Accordingly, in order to provide registrar 20 with the replica order information, merchant 14 may need to merely select a record identifying the product 4 and indicate that a replica 6 is to portray the selected product 4.

In response to receiving the product information and owner information from merchant computing device 320, registrar computing device 310 in step 440 orders from replica manufacturer 18 a replica 6 that portrays the product 4. In the automobile example, registrar 20 in step 440 may select a replica manufacturer 18 that can satisfy the replica order and provide the selected replica manufacturer 18 with make, model, exterior color, interior color, wheel design, VIN and/or other information about the product 4 to be portrayed by the replica 6. Alternatively, registrar 20 in step 440 may provide replica manufacturer 18 with a product number, catalog number, and/or other information from which replica manufacturer 18 can determine the visible features of the replica 6.

Replica manufacturers 18 typically only manufacturer replicas 6 for a subset of all possible products 4. For example, a particular replica manufacturer 18 may only manufacture replicas that portray Chrysler automobiles, whereas another replica manufacturer 18 may only manufacture replicas that portray Chevrolet automobiles. Accordingly, registrar computing device 310 in an exemplary embodiment maintains a database of replica manufacturer information which is used to select a proper replica manufacturer 18 to fulfill the replica order.

Registrar 20 in step 440 via registrar computing device 310 may also provide replica manufacturer 18 with the name and address of owner 12 of the product 4 so that replica manufacturer 18 can create a personalized certificate of ownership 8 that links the product 4 and the replica 6 to owner 12. In an alternative embodiment of the present invention, registrar computing device 310 includes printing capabilities (not shown) suitable for generating the personalized certificate of ownership 8. Accordingly, registrar 20 need not provide such ownership information to replica manufacturer 18.

In step 450, replica manufacturer 18 via replica manufacturer computing device 330 and network 340 receives the replica order from registrar computing device 310. Accordingly, replica manufacturer 18 in step 450 provides registrar 20 with a replica 6 which portrays the product 4. Replica manufacturer computing device 330 may determine that the current stock of replicas 6 already includes a suitable replica 6 for fulfilling the replica order. Accordingly, replica manufacture computing device 330 causes the identified replica 6 to be sent to registrar 20. Alternatively, replica manufacturer computer device 330 may determine that the a replica 6 must be custom manufactured to fulfill the order. In such a case, replica manufacturer computer device 330 causes the replica 6 to be manufactured to meet the visible features of the received replica order.

Independent of whether replica manufacture 18 custom manufactures the replica 6 or selects an appropriate replica 6 from the stock on hand, replica manufacturer 18 in an exemplary embodiment attaches an identification number to the replica 6. The identification number of the replica 6 may be similar to the identification number of the product 4 as described above with reference to FIG. 2.

In response to the order received from registrar 20, replica manufacturer 18 in step 450 may also provide registrar 20 with a certificate of ownership 8 that links the product 4 and the replica 6 to owner 12. For example, replica manufacture 18 may provide registrar 20 with a certificate of ownership 8 that includes ownership information such as the name and address of owner 12 and product information such as the identification number of the product 4, make of the product 4, model of the product 4, color of the product 4, etc. To provide a certificate of ownership 8, replica manufacturer computing device 330 may include printing capabilities (not shown). In particular, the replica manufacturer computing device 330 may generate the certificate of ownership 8 such that it resembles the state-issued title and registration for the product 4. Further, as indicated above, the certificate of ownership 8 in an alternative embodiment is generated by registrar computing device 310. Accordingly, in such an alternative embodiment, replica manufacturer 19 would not provide registrar 20 with a certificate of ownership 8 and replica manufacturer computing device 330 would not need printing capabilities.

Registrar 20 in step 460 via registrar computing device 310 updates registration records stored in data store 312 based upon the replica 6 and certificate of ownership 8 received from replica manufacturer 18. Registrar 20 may update the registration records of data store 312 to include information about the product 4, the replica 6, and owner 12. For example, registrar 20 may update the registration records to include the identification numbers of both the product 4 and the replica 6, and to associate the identification numbers of both the product 4 and the replica 6 with the name of owner 12.

The registrar 20 in step 460 may also update via registrar computing device 310 the registration records to include other information about the product 4, the replica 6, and/or owner 12. For example, registrar 20 may record visible features of the product 4 such as make, model, exterior color, interior color, engine type, wheel design, etc., and in particular record those visible features that are portrayed by the replica 6. Registrar 20 may also record other information about owner 12 such as address and telephone number.

In an alternate embodiment, registrar 20 may also update the registration records at a later time in response to a later filed request. Such later updating of the registration records enables registrar 20 to maintain current owner information for the registered replicas 6 and maintain a link of product 4 and the replica 6 to the current owner 12 if the replica 6 is later transferred to another owner 12. Registrar 20 may choose to offer such an update service at a fee in order to generate an additional revenue stream.

In step 270, registrar 20 provides owner 12 with the replica 6. Further, if a certificate of ownership 8 is generated for owner 12, then registrar 20 also provides owner 12 with the certificate of ownership 8. Registrar 20 may provide owner 12 with the replica 6 and the certificate of ownership by sending the replica 6 and the certificate of ownership 8 to merchant 14 and having merchant 14 transfer the replica product 6 and the certificate of ownership 8 to owner 12. Alternatively, registrar 20 may send the replica product 6 and the certificate of ownership 8 to owner 12 directly. Registrar 20 could also request that replica manufacturer 18 send the replica product 6 and the certificate of ownership 8 to owner 12 instead of registrar 20.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A method of providing a purchaser of a product with a replica portraying the product including the steps of:
   receiving product information relating to a visible feature of the product;
   offering to the purchaser of the product an opportunity to purchase a replica of the product, the offering step being performed by a merchant of the product, wherein the merchant of the product receives the product information;
   causing the replica including the visible feature to be transferred to the purchaser;
   providing a registrar for receiving the product information from the merchant, the registrar using the product information and information relating to an owner of the product to associate the product and the replica with the owner; and
   transferring a replica order from the registrar to a replica manufacturer; and
   providing a registrar computing device and a replica manufacturer computing device connected to the registrar computing device by a network, the replica order being transferred from the registrar computing device, over the network to the replica manufacturer computing device.

* * * * *